March 8, 1960 J. O. EDSON 2,927,967

NEGATIVE IMPEDANCE REPEATER

Filed Oct. 14, 1957 2 Sheets-Sheet 1

INVENTOR
J. O. EDSON
BY W L Keefauver
ATTORNEY

INVENTOR
J. O. EDSON
BY W. L. Keefauver
ATTORNEY

United States Patent Office 2,927,967

Patented Mar. 8, 1960

2,927,967

NEGATIVE IMPEDANCE REPEATER

James O. Edson, Oxford, N.J., assignor to Bell Telephone Laboratories, Incorporated, New York, N.Y., a corporation of New York Application October 14, 1957, Serial No. 689,857

20 Claims. (Cl. 179—15)

This invention relates to signal amplifying circuits and more specifically to negative impedance circuits.

Although applicable to pulse amplification generally, the invention finds a particular application in time division multiplex telephone systems, and will be described with reference to such a system. However, it is to be understood that the invention is not limited solely to such applications.

The need for increased information-handling capacity grows with the ever-increasing demand for communication services. Many practices for satisfying this need are possible.

In a telephone system, for example, a number of subscriber stations in one terminal may be connected to a number of other stations in another terminal by means of a common bus. A system of this type is described in a patent application of E. T. Burton et al., Serial No. 364,258, filed June 26, 1953. In transferring information between any pair of these subscriber stations, the practice of time-sharing or time division multiplexing may be used. As a result, the common bus and other expensive transmission facilities may be employed more efficiently. Briefly, this practice requires that in successive frames (time intervals further divided into subintervals comprising "guard spaces" and information-carrying "time slots"), a channel consisting of a pair of stations in communication with each other be assigned a discrete time slot. The time slot cyclically repeats itself. Whenever this time slot occurs, information at the pair of stations may be sampled, transmitted and received. During the interval between successive appearances of this particular time slot (i.e., during the remainder of the frame), the common bus is available to other stations. Thus, multiplex operation may be achieved by interlacing pulses of the various channels in communication.

In such a system it is necessary to incorporate many components which introduce transmission losses. These losses are incurred, for example, in sampling signals to be transmitted over a channel, in filtering and gating the sampled signals onto the common bus, and finally in performing the reverse of these processes at the receiving end of the channel.

It is necessary, if high-grade services are to be rendered in such a time-sharing system, that transmission losses either be kept at a minimum or that proper compensation be made for them.

Accordingly it is an object of this invention to improve signal transmission in time-sharing communication systems.

In some instances, adequate communication is possible by holding transmission losses to a minimum. This can be achieved, for example, by using more expensive filter networks. In other instances, however, such a solution may be either economically impractical or technically inadequate. This is the case, for example, where the terminals of a system are far removed from each other; or where substations within the same terminal are remotely situated. Therefore, a universal solution to the problem of overcoming these losses must be sought in means to compensate for them adequately and economically.

It is therefore a principal object of this invention to compensate for such losses adequately and economically. It is a related object of the invention that such compensation be economical enough to permit cost reduction in components (e.g., filters) wherever possible in a time-sharing communication system.

More specifically, it is a principal object of this invention to improve, yet cheapen and simplify pulse amplifiers.

One of the principal objects of this invention is to overcome various disadvantages and limitations inherent in present time-sharing communication systems. Accordingly, a few remarks relative to an illustrative system will now be made. Pulse amplifying circuits have been proposed for use in time-sharing communication systems. This is shown, for example, in Patent No. 2,429,613 to E. M. Deloraine et al., which issued October 28, 1947. As typical of the prior art, the amplifying circuit disclosed in the Deloraine patent is effective to amplify only outgoing calls, i.e., calls from one terminal, over the common bus, to another terminal. No provision is made to amplify revertive calls, i.e., calls from one substation to another substation within the same terminal. Often, the subscriber lines which connect these substations through the various terminal circuits are relatively long. Amplification of revertive calls over such lines may then be necessary. Also, it should be noted that the amplifying circuit shown in the above-cited Deloraine patent is relatively expensive and complex in that it comprises a plurality of individual amplifiers, each further comprised of a number of stages. Moreover, each of the plurality of amplifiers is unilateral. Consequently, two sets of amplifiers are needed, one to amplify signals in one direction down the common bus and the other to amplify signals in the other direction.

For each of the foregoing disadvantages the present invention permits a corresponding advantage to be obtained.

In an illustrative embodiment of the present invention, the amplifier equivalent of a two-terminal "negative tuned circuit" is provided to amplify a train of pulses separated by guard intervals. The amplifier comprises a pair of transistors operated in class B and connected in push-pull relationship. It has an input and an output, which are interconnected by a positive feedback loop. Included in this loop is a series resonant circuit comprising a capacitor. Switching means are provided to discharge the capacitor during the guard intervals.

It is a feature of the present invention that in a time-sharing communication system, a single amplifier, common to all terminals and each of the substations of which they are comprised, amplifies and reshapes all pulses, revertive as well as outgoing.

A fuller understanding of the nature of the invention and other of its objects, features and advantages may be had by considering the illustrative embodiments now to be described with reference to the accompanying drawings.

Figure 5A:
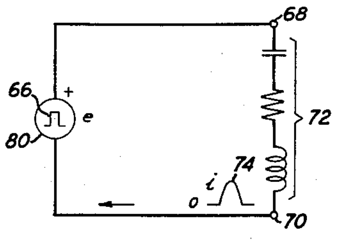
Figure 5B:
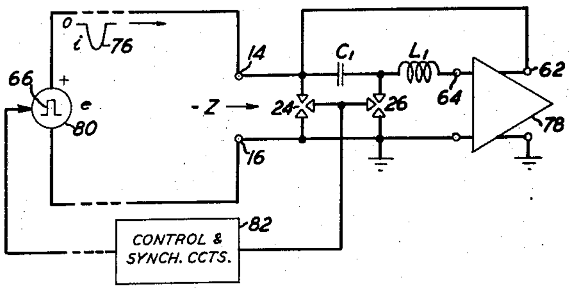

Figs. 5($a$) and 5($b$) show each of the amplifiers, illustrative of the invention, to be the negative equivalent of a series tuned circuit.

Figure 6:
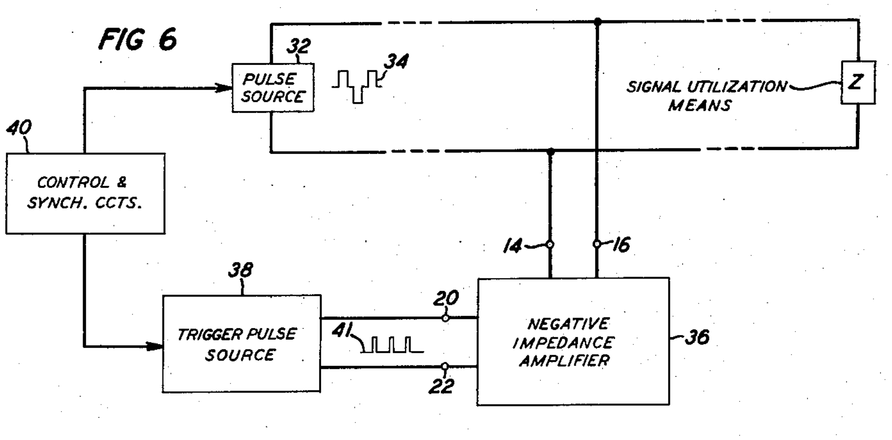
Figure 7:
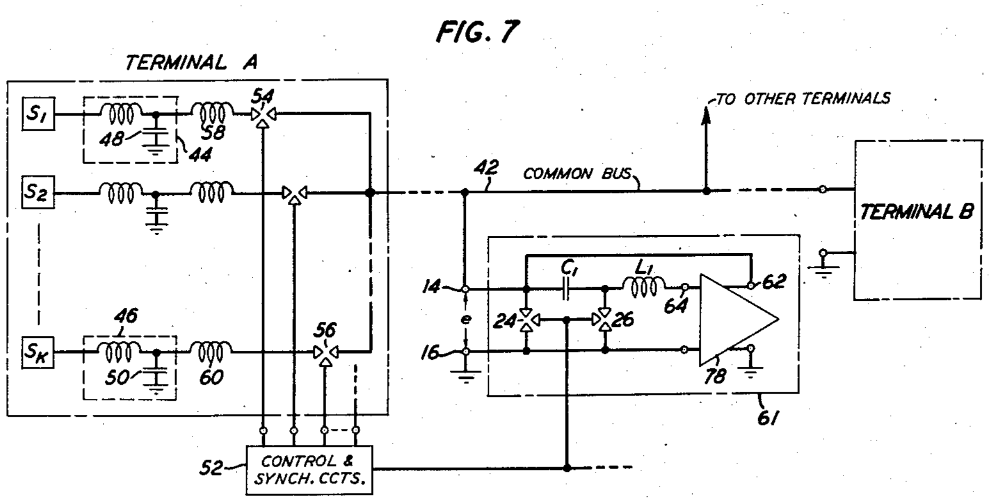

Fig. 6 is a schematic diagram which shows a system for translating pulses in accordance with the invention; and Fig. 7 is a partially schematic diagram which illustrates a simplified time-sharing communication system in which multiplexed pulses are amplified and reshaped in accordance with the present invention.

It should be noted that like reference characters refer to like elements in the various figures of the drawings.

Figure 1:
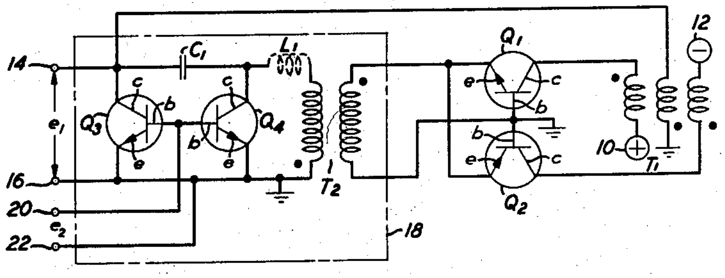
Fig. 1 is a circuit diagram of a negative impedance amplifier in accordance with the invention.

The amplifier of Fig. 1 comprises two transistors $Q_1$ and $Q_2$ of opposite conductivity types, connected in complementary relationship and operated in class B. By way of example, transistors $Q_1$ and $Q_2$ are shown as being of the N-P-N and P-N-P types, respectively.

The input electrodes *e* (the emitters) of transistors $Q_1$ and $Q_2$ are interconnected, as are the common electrodes *b* (the bases). Intercoupling the output electrodes *c* (the collectors) with the input electrodes *e* of transistors $Q_1$ and $Q_2$ is a positive feedback circuit comprising an output transformer $T_1$ and a series tuned circuit. This tuned circuit includes a capacitor $C_1$ and the leakage inductance $L_1$ of input transformer $T_2$. For efficient transfer of power, transformer $T_1$ has a suitable voltage step down ratio. To step up the current to the emitters *e* of the transistors $Q_1$ and $Q_2$, transformer $T_2$ also has a suitable voltage step down ratio.

Pulses $e_1$, to be amplified (see Fig. 2), are supplied across the terminals 14 and 16 and thence across the input electrodes *e* and common electrodes *b* of transistors $Q_1$ and $Q_2$ via an input circuit 18. The input circuit 18 includes the series tuned circuit $L_1$—$C_1$. The values of $L_1$ and $C_1$ are selected so that the tuned circuit is resonant at a frequency equal to the inverse of twice the duration of a pulse (signal $e_1$) supplied across the input terminals 14 and 16. Not only does the series tuned circuit $L_1$—$C_1$ reshape input pulses which are supplied across the terminals 14 and 16, it also shapes the pulses which are fed back around the positive feedback circuit intercoupling the output electrodes *c* and the input electrodes *e* of transistors $Q_1$ and $Q_2$. The shaping function of the circuit of Fig. 1 will become more apparent in the following discussion.

The input circuit 18 also includes a switching circuit which comprises transistors $Q_3$ and $Q_4$. They discharge either side of capacitor $C_1$ to ground in response to a signal $e_2$ (see Fig. 2) which is supplied across terminals 20 and 22. These transistor switches are normally in an Off or a disabled condition. Signal $e_2$ consists of a train of trigger pulses which occupy time positions substantially coincident with the guard spaces between the pulses of input signal $e_1$ (see Fig. 2). The trigger pulses are of sufficient amplitude to enable transistor switches $Q_3$ and $Q_4$. Switches $Q_3$ and $Q_4$ are therefore On or enabled only when the pulses of input signal $e_1$ are absent from terminals 14 and 16; and, during these times, the switches $Q_3$ and $Q_4$ ensure the stability of the amplifier by clearing out residual energy stored in capacitor $C_1$.

It should be noted that transistors $Q_1$ and $Q_2$ are connected in the common base configuration in the preferred embodiment of Fig. 1. This configuration is preferable if variations in the amplification factor $\alpha$ are large and the consequent variations in current gain are to be minimized. In such a configuration the current gain is simply $\alpha$, rather than $\alpha/(1-\alpha)$ which is the current gain of a transistor in the common emitter configuration. Thus the current gain of transistors $Q_1$ and $Q_2$ will vary directly with $\alpha$ rather than inversely with the factor $(1-\alpha)$, as would be the case if they were connected in the common emitter configuration. Current amplification is not sacrificed, since this is achieved by the transformers $T_1$ and $T_2$.

Figure 2:
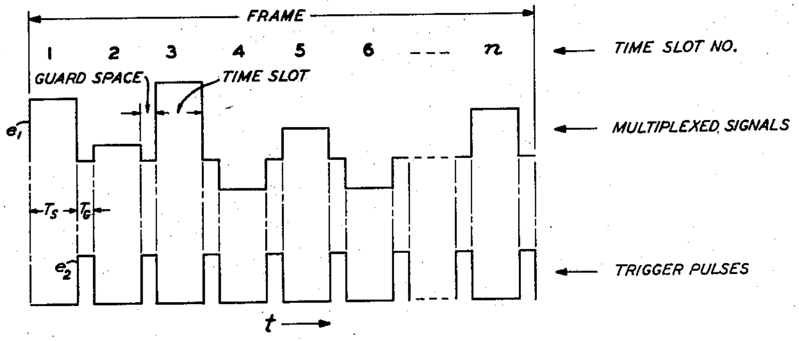
Fig. 2 shows wave forms which illustrate the operation of the amplifier of Fig. 1.

Fig. 2 is an explanatory diagram. It shows, by way of example, typical wave forms which may represent the signals $e_1$ and $e_2$ discussed in connection with Fig. 1. The signal $e_1$ comprises a multiplexed train of pulses of negative or positive polarity, each occurring in one of *n* discrete time slots, where *n* equals the number of channels in a time-sharing system. The signal $e_2$ comprises a train of trigger pulses which are synchronized with the pulses of the signal $e_1$. As previously mentioned, these trigger pulses occur during the time intervals between the pulses of signal $e_1$. These time intervals are called guard spaces.

This means that trigger pulses are applied across the terminals 20 and 22, in Fig. 1, substantially only when multiplexed pulses are absent from the terminals 14 and 16. Note that the signal $e_1$ represents a signal which has been pulse-amplitude-modulated. It should be understood, however, that the present invention is applicable to amplify and reshape pulses generally, and is not limited to any particular method of pulse modulation.

Figure 3:
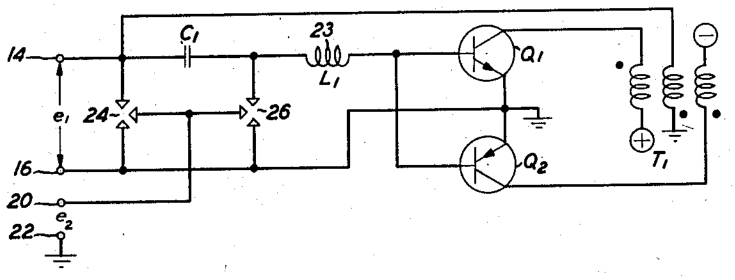
Fig. 3 is a circuit diagram which shows an alternative arrangement of the amplifier of Fig. 1.

An alternative to the circuit arrangement of Fig. 1 is shown in Fig. 3. The amplifier of Fig. 3 is different from that of Fig. 1 in the following respects: The transistors $Q_1$ and $Q_2$ are in the common emitter rather than the common base configuration; input transformer $T_2$ is omitted; an inductor 23 is substituted for the leakage inductance $L_1$ of Fig. 1; and generalized switches 24 and 26 are shown instead of the transistor switches $Q_3$ and $Q_4$. The normally open switches 24 and 26 may be of any suitable type well known to those skilled in the art. For example, they may be gas tubes. Also, the inductance of inductor 23 is equal to the leakage inductance $L_1$ of Fig. 1.

Elimination of the input transformer $T_2$ of Fig. 1 is desirable under certain conditions and may be possible whenever the amplification factor $\alpha$ of the transistors $Q_1$ and $Q_2$ is not subject to intolerable variation. Although the transformer $T_2$ is omitted in the circuit of Fig. 3, the required current amplification is still obtained since, as previously mentioned, the current gain of transistors $Q_1$ and $Q_2$ is $\alpha/(1-\alpha)$ when they are connected in the common emitter configuration. Moreover, the number of phase reversals provided in the feedback loop of Fig. 1 remains the same in the feedback loop of Fig. 3 despite the omission of transformer $T_2$, since a phase reversal is provided by transistors $Q_1$ and $Q_2$ by virtue of their being in the common emitter configuration.

Figure 4:
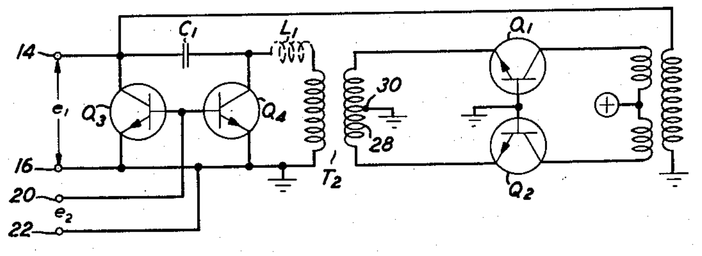
Fig. 4 is a circuit diagram which shows still another alternative arrangement of the amplifier of Fig. 1.

Still another arrangement of the amplifier of Fig. 1 is shown in Fig. 4. The transistors of Fig. 4 are all of like conductivity type and are shown, by way of example, as being of the N-P-N variety. The secondary coil 28 of transformer $T_2$ has a center tap 30, as is customary in push-pull amplifiers which use vacuum tubes, or transistors of like conductivity type.

Figs. 5(*a*) and 5(*b*) compare a positive tuned circuit with an illustrative embodiment of the present invention. As shown in Fig. 5(*a*), a positive rectangular pulse of voltage 66, when applied across the terminals 68 and 70 of a series tuned circuit 72, results in a pulse of current 74 in the shape of a positive half-sinusoid. (For present purposes, it is not necessary to consider further oscillations of circuit 72 other than the pulse of current 74.)

On the other hand, the illustrative embodiment of Fig. 5(*b*) has the advantageous property (which will be more readily apparent in the discussion of Fig. 7) that when the positive rectangular pulse of voltage 66 is applied across the terminals 14 and 16, the net result is a pulse of current 76 in the shape of a negative half-sinusoid.

Note, however, that the shape of the current flowing through the tuned circuit $L_1$—$C_1$ to the input 64 of the amplifying portion 78 of the circuit connected between terminals 14 and 16 is a positive half-sinusoid similar to the shape of current pulse 74 of Fig. 5(*a*). The amplifying portion 78 produces at its output 62 an enlarged replica of the current pulse supplied to its input 64. This enlarged replica is regeneratively fed back to the input 64 so that the net current 76 is negative as shown. The circuit connected between terminals 14 and 16 thus acts as though it were a "negative tuned circuit," the resonant frequency of which is determined by the series combination of inductor $L_1$ and capacitor $C_1$. Accordingly, it is appropriately called a negative impedance amplifier.

Normally open switches 24 and 26, controlled to operate in synchronism with the pulse generator 80 by control and synchronizing circuits 82, are used to prevent a reversal of polarity of the current wave 76; i.e., to prevent singing of the circuit connected between terminals 14 and 16. This is achieved by closing switches 24 and 26 at the instant the rectangular voltage pulse 66 has completed its positive excursion, thus discharging capacitor $C_1$ and rendering passive the circuit connected between terminals 14 and 16.

To illustrate an application of the illustrative amplifiers described above, there is shown in Fig. 6 a simplified pulse translating system comprising a source 32 of pulses 34, signal utilization means Z, an amplifier 36 similar to those described, and a source 38 of trigger pulses 41. The trigger pulse source 38 is synchronized with the pulse source 32 by the control and synchronizing circuits 40 so that trigger pulses 41 are applied across terminals 20 and 22 only during guard spaces between the pulses 34. The control and synchronizing circuits 40 may include, for example, delay networks and the like to ensure the discharge of capacitor $C_1$ (see Fig. 1) at the proper times.

The simplified time-sharing telephone system of Fig. 7 comprises terminals A and B (and others not shown) which are interconnected by a common bus 42. Only terminal A is particularized, and then only slightly, to facilitate the following description. Terminals A and B may, for example, each comprise a P.B.X or any switching system controlled and operated on a time-sharing basis.

Terminal A, as shown by way of example, comprises subscriber circuits $S_1, S_2, \ldots S_k$, where $k$ equals the number of such circuits in terminal A. Associated with each of these subscriber circuits are a low pass filter, terminating in a shunt capacitor, and a gate which couples signals onto the common bus 42. A gating circuit, which satisfies the requirements of alternate zero and infinite impedance to current flow in either direction and suitable for use here, comprising a pair of transistors connected back-to-back, is shown in J. D. Johannesen et al. Patent No. 2,899,570, which issued August 11, 1959.

Control and synchronizing circuits 52 selectively enable the gates associated with subscriber circuits $S_1, S_2, \ldots S_k$. Thus, a channel connection between two subscriber circuits, directly or over the common bus 42, is effected by periodically enabling their associated gates in coincidence. For illustrative control and synchronizing circuits, see the above-cited Burton application.

In addition to the low-pass filter and the gate, an inductor is associated with each of the subscriber circuits. The inductor prevents the build-up of any significant current while its associated gate is changing condition, and thus prevents any loss due to spark dissipation and the like. The combination of the inductor, the gate, and the shunt capacitor which terminates each filter is included in what is called a resonant transfer circuit.

In accordance with the principles of resonant transfer, the above-mentioned inductor (hereinafter called a "resonant transfer inductor") is included in the connections between its associated subscriber circuit and the common bus 42 to prevent any loss corresponding to spark dissipation. This principle is described in W. D. Lewis application Serial No. 633,358 which was filed January 9, 1957. It would be well here to illustrate this principle with reference, by way of example, to a revertive call between subscriber circuits $S_1$ and $S_k$. Note that the low-pass filters 44 and 46 are terminated in capacitors 48 and 50, respectively. In each frame a time slot is provided for subscriber circuits $S_1$ and $S_k$ (see Fig. 2). Whenever this time slot occurs, control and synchronizing circuits 52 enable gates 54 and 56.

Suppose, for example, that at a given instant signal information is being sampled at subscriber circuit $S_1$ and is to be transmitted to subscriber circuit $S_k$. The capacitor 48 becomes charged by this signal. When control and synchronizing circuits 52 enable gates 54 and 56, the signal stored in capacitor 48 is transferred through the resonant transfer inductor 58, gates 54 and 56, and resonant transfer inductor 60 to capacitor 50. The circuit which consists of capacitors 48 and 50, inductors 58 and 60, and gates 54 and 56 is called a resonant transfer circuit. It has a resonant frequency equal to $1/2T_s$ where $T_s$ equals the duration of a time slot (see Fig. 2). Control and synchronizing circuits 52 simultaneously enable gates 54 and 56 only for intervals substantially equal to $T_s$ which is one-half the period of an oscillation of the resonant transfer circuit. Consequently, in one-half an oscillation of the resonant transfer circuit, the charge on capacitor 48 is transferred to capacitor 50; and at the instant of current reversal, control and synchronizing circuits 52 disable gates 54 and 56. Thus, if the duration of a time slot is two microseconds, for example, then each resonant transfer circuit of the system has a resonant frequency of 250 kilocycles per second (or an oscillation period of four microseconds); and each of the resonant transfer gates is enabled to transfer energy for individual periods of two microseconds.

The resonant transfer inductors 58 and 60 are inserted in series with their respective gates 54 and 56 to transfer substantially all of the energy stored in capacitor 48 to capacitor 50. Without these inductors, the capacitors 48 and 50 would share charges whenever gates 54 and 56 were opened. As a result, each capacitor would ultimately possess half the charge at half the voltage. In other words, one-half the original energy would remain stored in the capacitors. The other half would be lost in spark dissipation or in high frequency oscillations.

Shown intermediate the terminals A and B is a partially schematic representation of an amplifier circuit 61 in accordance with the invention. An advantageous property of the amplifier 61 is that it is bilateral. It amplifies and reshapes all pulses on the common bus, whether they are transmitted for outgoing (inter-terminal) or revertive (intra-terminal) calls. For example, the amplifier circuit 61 amplifies signals transmitted between, say, subscriber circuits $S_1$ and $S_k$ within terminal A equally as well as it does signals transmitted between terminals A and B.

The output 62 of the amplifying portion 78 of circuit 61 is coupled to the input 64 by means of a positive feedback loop which includes a series tuned circuit. The tuned circuit comprises a capacitor $C_1$ and an inductor $L_1$, the values of which are selected so that the resonant frequency of the tuned circuit is substantially equal to the resonant transfer frequency discussed above. It is not necessary that the tuned circuit $L_1$—$C_1$ have a high Q. It is necessary, however, that the first loop of the oscillatory response of this circuit (and consequently of amplifier circuit 61 of which the tuned circuit is an integral part) be substantially a half sine wave of current. This requirement is met by circuit 61 for the reasons discussed in connection with Fig. 5(*b*). Reversal of polarity of the current wave is prevented by switches 24 and 26 as will be described below. A sinusoidal current response is wanted because each of the resonant transfer circuits has this type of response; and it should be noted that the purpose of the amplifier circuit 61 is to augment and reshape signals transferred by these resonant transfer circuits.

The normally opened switches 24 and 26 are controlled by control and synchronizing circuits 52 to discharge capacitor $C_1$ during the guard spaces between multiplexed signals which appear across the terminals 14 and 16 (see the wave form $e_1$ of Fig. 2). Thus, during those periods when all of the gates which transfer signals onto the common bus are disabled or closed, switches 24 and 26 clear out residual energy stored in capacitor $C_1$ and hold passive the amplifier circuit 61. This prevents steady singing of the amplifier by itself, thus insuring the half-sinusoidal current response discussed above, and minimizes interchannel crosstalk.

Although the present invention has been discussed with reference to specific embodiments, they should be considered as illustrative, for the invention also comprehends such other embodiments as come within its spirit and scope.

What is claimed is:

1. A circuit for amplifying and shaping pulses separated by guard spaces comprising an amplifier having an input and an output, means for applying said pulses to said input, positive feedback means interconnecting said input and said output and including a series tuned circuit, said series tuned circuit comprising a capacitor, switching means for recurrently discharging said capacitor, and control means for enabling said switching means to discharge said capacitor in synchronism with said guard-spaced pulses.

2. A circuit as defined in claim 1 wherein said control means comprises means to enable said switching means to discharge said capacitor only during said guard spaces.

3. A circuit as defined in claim 1 wherein said switching means comprise a pair of normally Off transistors shunting said input of said amplifier.

4. A circuit as defined in claim 1 wherein said means for applying said pulses to said input of said amplifier comprises a transformer and wherein said series tuned circuit further comprises the leakage inductance of said transformer.

5. A negative impedance circuit for amplifying electrical pulses occupying time slots separated by guard spaces, said negative impedance circuit comprising amplifying means having an input and an output, means including a series tuned circuit for applying said pulses to said input, said tuned circuit having a resonant frequency substantially equal to $1/2T_s$ where $T_s$ is the time duration of each of said pulses, and a positive feedback circuit interconnecting said output and said input and including said series tuned circuit.

6. A negative impedance circuit as defined in claim 5 and oscillation inhibiting means for rendering said negative impedance circuit passive during said guard spaces.

7. A negative impedance circuit as defined in claim 5 wherein said series tuned circuit includes a capacitor and wherein said negative impedance circuit further comprises switching means for recurrently discharging said capacitor, and means for enabling said switching means to discharge said capacitor during said guard spaces.

8. A negative impedance circuit as defined in claim 7 wherein said tuned circuit further includes an inductor connected in series with said capacitor.

9. In combination a first pair of transistors, each of said transistors including input, output, and common electrodes, means for connecting said transistors in push-pull relationship, a source of pulses occupying time slots separated by guard spaces, means for applying said pulses across said input and common electrodes, positive feedback means for intercoupling said output electrodes with said input electrodes including a series tuned circuit having a resonant frequency equal to the inverse of twice the period of one of said time slots, said tuned circuit comprising a capacitor, switching means for recurrently discharging said capacitor comprising a second pair of transistors in a normally disabled condition, and means for enabling said second pair of transistors to discharge said capacitor during said guard spaces, said last-named means comprising means for generating trigger pulses corresponding in polarity to the conductivity type of said second pair of transistors, said trigger pulses substantially coinciding in time with said guard spaces.

10. In combination a source of pulses occupying time slots separated by guard spaces; a pair of transistors of opposite conductivity types, each of said transistors having emitter, collector, and base electrodes; means for connecting said transistors in push-pull relationship; means for coupling said source of pulses across said base and emitter electrodes of each of said transistors; positive feedback means coupling the collector electrode of each of said transistors to its associated emitter electrode, said feedback means comprising a series tuned circuit including a capacitor, said tuned circuit having a resonant frequency approximately equal to the inverse of twice the period of one of said time slots; switching means for recurrently discharging said capacitor; and control means for enabling said switching means to discharge said capacitor during said guard spaces.

11. The combination in accordance with claim 10 wherein said means for coupling said source across said base and emitter electrodes comprises transformer coupling means and wherein said tuned circuit further includes the leakage inductnace of said transformer coupling means.

12. A two-terminal negative impedance circuit for amplifying electrical pulses being transmitted over a transmission line comprising amplifying means having an input and output, coupling means including a series tuned circuit for bridging said input of said amplifying means across said transmission line, and a positive feedback circuit coupling said output of said amplifying means to said input and including said series tuned circuit, said tuned circuit being resonant at a frequency substantially equal to the reciprocal of twice the time duration of one of said pulses.

13. A negative impedance circuit in accordance with claim 12 wherein said means bridging said input of said amplifier across said transmission line further includes a transformer having primary and secondary windings and wherein said tuned circuit includes a capacitor connected in series with said primary winding.

14. A time-sharing communication system for the transmission of time-multiplexed signals comprising a plurality of signal sources, a common bus, individual means associated with each of said sources for coupling said sources to said bus, said coupling means including resonant transfer means of a specified resonant frequency for gating said signals onto said bus, means for amplifying said signals comprising an amplifier having an input and an output, means for connecting the input of said amplifier in shunt with said bus, and positive feedback means for interconnecting the output and input of said amplifier including a series tuned circuit whose resonant frequency is substantially equal to said resonant frequency of said resonant transfer means.

15. A time-sharing communication system for the transmission of time-multiplexed signals separated in time by guard spaces comprising a plurality of signal sources; a common bus; individual means for coupling each of said sources to said bus, said coupling means including resonant transfer means of a specified resonant frequency for gating said signals onto said bus; means for amplifying said signals comprising an amplifier having an input and an output; means for connecting the input of said amplifier in shunt with said bus; positive feedback means for interconnecting the output and input of said amplifier including a series tuned circuit whose resonant frequency is equal to said resonant frequency of said resonant transfer means, said series tuned circuit including a capacitor; switching means for recurrently discharging said capacitor; and means for operating said switching means in response to said time-multiplexed signals, said switching means being operative to discharge said capacitor only during said guard spaces.

16. A time-sharing communication system for the transmission of time-multiplexed signals separated in time by guard spaces comprising a plurality of signal sources and signal utilization means; a common bus; individual means coupling said bus to said sources and said signal utilization means, said coupling means including resonant transfer means of a specified resonant frequency for gating said signals onto said bus; means for amplifying said signals comprising an amplifier having an input and an output; means for connecting the input of said amplifier in shunt with said bus; said last-named means including transformer coupling means; positive feedback means for interconnecting the output and input of said amplifier including a series tuned circuit whose resonant frequency is substantially equal to said resonant frequency of said resonant transfer means, said series tuned circuit including a capacitor; switching means for recurrently discharging said capacitor comprising a pair of transistors one being connected on either side of said capacitor; and pulse-generating means for biasing said transistors to be ON only when said time-multiplexed signals are absent from said input of said amplifier, the pulses from said pulse-generating means substantially coinciding in time with said guard spaces.

17. A time-sharing communication system in accordance with claim 16 wherein said series tuned circuit also comprises the leakage inductance of said transformer coupling means.

18. A time-sharing communication system for the transmission of time-multiplexed signals occupying time slots separated by guard spaces comprising a plurality of signal sources and signal utilization means; a common bus; individual means associated with each of said sources and said signal utilization means for coupling said bus to said sources and said signal utilization means, said coupling means including resonant transfer means having a resonant frequency equal to the inverse of twice the period of one of said time slots, said resonant transfer means comprising gating means; means for selectively enabling each said gating means to pass said signals onto said bus only during a preselected one of said time slots; means for amplifying said signals comprising an amplifier having an input and an output; means for connecting the input of said amplifier between said bus and a point of reference potential; positive feedback means interconnecting the output and input of said amplifier, including a series tuned circuit whose resonant frequency is substantially equal to said resonant frequency of said resonant transfer means, said series tuned circuit including a capacitor; switching means for recurrently discharging said capacitor comprising a pair of transistors; and trigger-pulse generating means for biasing said transistors to be operative to discharge said capacitor only when said time-multiplexed signals are absent from said input of said amplifier, said trigger pulses substantially coinciding in time with said guard spaces.

19. A signal transfer circuit for the transfer of multiplexed pulses occupying time slots separated by guard spaces, said signal transfer circuit comprising resonant transfer means and an amplifier; said resonant transfer means having a resonant frequency equal to the inverse of twice the period of one of said time slots and including a common bus; said amplifier having an input and an output; means connecting said input between said common bus and a point of reference potential; positive feedback means coupling said input to said output and comprising a series tuned circuit, said series tuned circuit having a resonant frequency substantially equal to that of said resonant transfer means.

20. A signal transfer circuit in accordance with claim 19 wherein said series tuned circuit includes a capacitor; and said signal transfer circuit further comprises switching means for discharging said capacitor, and means for enabling said switching means to discharge said capacitor during said guard spaces.

References Cited in the file of this patent

UNITED STATES PATENTS

| | | |
|---|---|---|
| 2,221,452 | Lewis | Nov. 12, 1940 |
| 2,429,613 | Deloraine et al. | Oct. 28, 1947 |
| 2,659,773 | Barney | Nov. 17, 1953 |
| 2,663,766 | Meacham | Dec. 22, 1953 |
| 2,802,118 | Simkins | Aug. 6, 1957 |
| 2,809,303 | Collins | Oct. 8, 1957 |